United States Patent [19]

Gradl et al.

[11] 4,444,729

[45] Apr. 24, 1984

[54] MULTISTAGE COLUMN FOR COUNTERCURRENT EXTRACTION OF LIQUIDS

[75] Inventors: Reinhard Gradl, Hürth; Günther Schimmel, Erftstadt, both of Fed. Rep. of Germany

[73] Assignee: Hoechst Aktiengesellschaft, Fed. Rep. of Germany

[21] Appl. No.: 393,695

[22] Filed: Jun. 30, 1982

[30] Foreign Application Priority Data

Jul. 6, 1981 [DE] Fed. Rep. of Germany ....... 3126598

[51] Int. Cl.³ ............................................. B01N 11/04
[52] U.S. Cl. .................................... 422/257; 210/511; 422/259
[58] Field of Search ................. 210/311; 422/257–259

[56] References Cited

U.S. PATENT DOCUMENTS

| | | | |
|---|---|---|---|
| 1,845,128 | 2/1932 | Coahran | 422/259 |
| 2,667,407 | 1/1954 | Fenske et al. | 422/257 |
| 3,013,780 | 12/1961 | Wistrich | 422/257 |
| 3,439,904 | 4/1969 | Oldshue et al. | 422/258 |

FOREIGN PATENT DOCUMENTS 828794  5/1938  France ................................ 422/257

*Primary Examiner*—John Adee

*Attorney, Agent, or Firm*—Connolly and Hutz

[57] ABSTRACT

The disclosure relates to a multistage column for countercurrent extraction of two liquids of different specific density therein. The column is comprised of a housing in upright position provided at its upper end with an upper inlet and upper outlet and, at its lower end, with a lower inlet and lower outlet, the upper inlet and lower outlet permitting specifically denser liquid to be introduced into the column and to be taken therefrom, and the lower inlet and upper outlet permitting specifically less dense liquid to be introduced into the column and to be taken therefrom. Arranged centrally within the housing so as to extend vertically downward therein is a shaft and a plurality of stirring means which are spaced apart from each other are secured to the shaft, perpendicularly with respect thereto. A plurality of annular stator collars are mounted within the region of the inside wall of the housing, the individual stator collars being arranged downstream of, and spaced apart from, each other. Each stirring means has at least one disk with a diameter sufficient to cover the inner free area of the respective stator collar, secured thereto, at at least one place thereof. The stirring means and/or the stator collars are vertically movable against each other at a separation L. Encircling packings permitting the disks and stator collars to be sealed are provided at at least on position between disks and stator collars.

8 Claims, 11 Drawing Figures

MULTISTAGE COLUMN FOR COUNTERCURRENT EXTRACTION OF LIQUIDS

The present invention relates to a column for the countercurrent extraction of two liquids of different specific densities therein, comprising a housing in upright position provided, at its upper end, with an upper inlet and upper outlet and, at its lower end, with a lower inlet and lower outlet, the upper outlet and lower inlet permitting the specifically denser liquid to be introduced into the column and to be taken therefrom, and the lower inlet and upper outlet permitting the specifically less dense liquid to be introduced into the column and to be taken therefrom, a shaft arranged centrally within the housing so as to extend vertically downward therein, and a plurality of stirring means which are spaced apart from each other, the individual stirring means being secured to the shaft, perpendicularly with respect thereto.

German Patent DE-PS No. 12 55 633 describes a column for the countercurrent extraction of two liquids of different specific densities, wherein a cylindrical housing in upright position is provided at its upper and lower end portions, respectively, with two inlets and outlets permitting the two liquids to be introduced thereinto and to be taken therefrom. Arranged centrally within the housing so as to extend downwardly therein is a driving shaft provided with a plurality of stirrers which are arranged one downstream of another and spaced apart from each other and secured to the shaft, rectangularly with respect thereto, the stirring means being positioned between annular guide walls. Disposed between the stirring means in horizontal position are partitions with perforated middle portions, subdividing the housing into two column stages.

During operation, the carrier phase with the substance to be extracted contained therein, is introduced into the extraction column, at the upper end thereof in the event of the carrier phase being the specifically denser liquid, or at the lower end thereof, in the event of the carrier phase being the specifically less dense liquid, whilst the extracting agent is introduced thereinto, countercurrently with respect to the carrier phase. By means of energy which is admitted via the rotating stirring means, the carrier phase is dispersed in the extracting agent or inversely the extracting agent is dispersed in the carrier phase.

In the state of equilibrium, an axial concentration gradient of the substrate to be extracted will be found to establish inside the extracting column in the carrier phase as well as in the extracting agent; under ideal conditions, the concentration of the substance to be extracted decreases in the carrier phase from the introduction place to practically zero at the delivery place and inversely increases in the extracting agent from zero to a maximum.

A technically adverse effect encountered upon the use of extraction columns such as those described heretofore resides in the fact that during standstill (discontinuous operation or operational disturbance) the two liquid phases initially undergo phase separation, the specifically less dense phase rising in the column and the denser phase settling in the column bottom portion. In addition to this, the concentration gradient which corresponds to the state of equilibrium is destroyed inasmuch as the concentration of the substrate to be extracted is rendered constant in the two phases by diffusion also in axial direction so that the distribution coefficient remains the only factor determining the difference in concentration of the substance to be extracted between the two phases.

As a result, upon the extraction column described heretofore being reset to operation, important quantities of substance to be extracted are discharged together with the carrier phase. This in turn results in the extract phase becoming seriously contaminated or in heavy loss of desired material.

The present invention now provides an extraction column allowing the carrier phase and extracting agent to undergo phase separation during standstill within limited regions only and permitting the concentration gradient of the substance to be extracted, corresponding approximately to the state of equilibrium, to be substantially maintained in axial direction of the column, the column being comprised of a cylindrical housing which is provided with inlets and outlets permitting liquids of different specific densities to be introduced thereinto and to be taken therefrom, with a shaft arranged centrally within the housing so as to extend vertically downward therein, and with a plurality of stirring means spaced apart from each other, and arranged one downstream of another, the individual stirring means being secured to the shaft, rectangularly with respect thereto. More particularly, the invention provides for a plurality of annular stator collars to be mounted within the region of the inside wall of the housing, the individual stator collars being arranged downstream of, and spaced apart from, each other; for a disk with a diameter sufficient to cover the inner free area of the respective collar to be secured to each stirring means at at least one place thereof; for the stirring means and stator collars, respectively, to be arranged so as to be vertically movable against each other at a spacing L; and for at least one encircling packing means permitting the disks and stator collars to be sealed, to be arranged at at least one position between each disk and stator collar.

Further preferred features of the present invention provide:

(a) for the stator collars to be secured to the inside wall of the housing, a lifting cylinder permitting the shaft which provides support for the stirring means to be lifted or lowered;

(b) for the shaft providing support for the stirring means to be rigidly mounted and for tie rods providing support for the stator collars to be suspended from the lifting cylinder permitting the stator collars to be lifted or lowered;

(c) for the tie rods to have spacers pulled over them, within the region between the stator collars;

(d) for the disks to be formed with outwardly directed, and the stator collars to be formed with inwardly directed extensions of elastic material;

(e) for each of the stator collars to be formed at its upper side and under side, respectively, with an O-shaped ring; and (f) for each of the stator collars to be formed at its upper side and under side, respectively, with a bellows.

With the shaft supporting the stirring means being kept at standstill and with the inlets and outlets kept closed by lowering or lifting the stirring means or stator collars, which may be made into a package, it is possible to bring adjacent disks and stator collars into a position permitting the present column to be closed several times across its entire cross-sectional area at different levels, one downstream of another. In this way, various chambers of which each is separated from the other are being formed inside the column. While it is allowable for these chambers to be formed between each disk and stator collar, it is necessary that their number corresponds at least to the number of theoretical trays in the extraction column.

As a result, with the extraction column at standstill, the two liquid phases undergo phase separation inside the closed chambers only, the equilibrium established during operation in respect of the concentration gradient in axial direction being maintained. In other words, in the column reset to operation, the extraction proceeds practically the same way as before shutdown, defective batches or adverse effects on the yield being thus avoided.

The column of this invention provides for the shaft or stator collars which may be made into a package, to be lowered or lifted mechanically, hydraulically or pneumatically. The lifting path is however required to correspond to the vertical spacing between the disks associated with the stirring means, and the stator collars.

An exemplary embodiment of the present invention is shown diagrammatically and partially in section in the accompanying drawings, in which.

Figure 3:
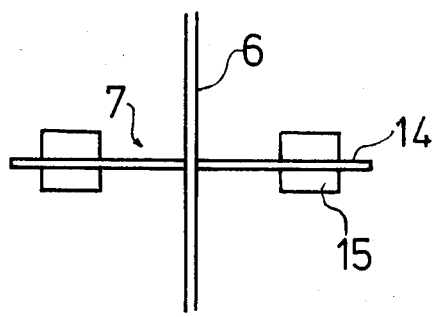
Figure 4:
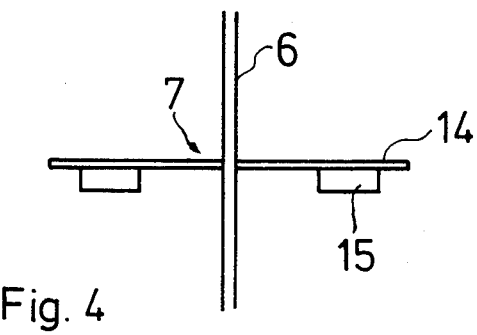
Figure 5:
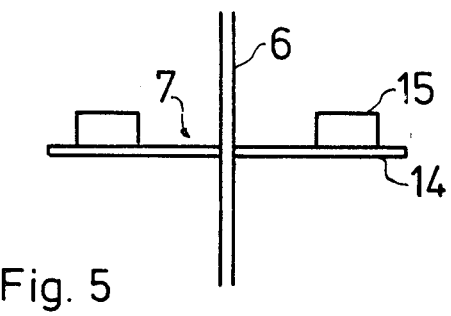
Figure 6A:
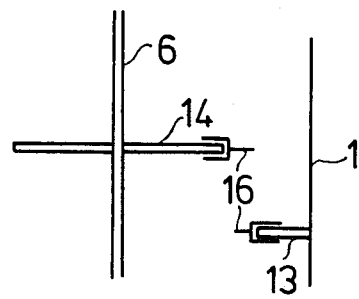
Figure 6B:
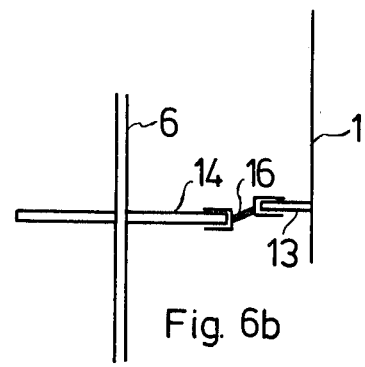
Figure 7A:
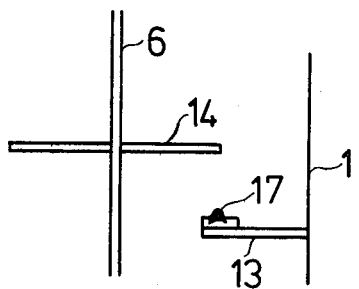
Figure 7B:
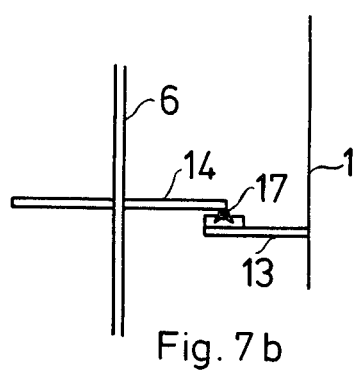
Figure 8A:
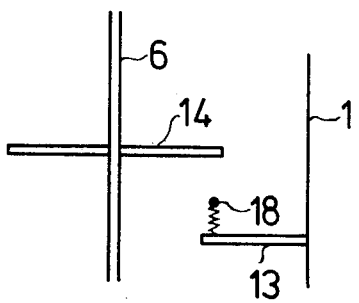
Figure 8B:
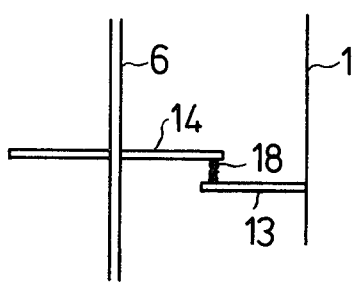

FIGS. 3, 4 and 5, respectively, show various arrangements of baffle plates;

FIGS. 6a and 6b, respectively, show an exemplary form of sealing the rotor and stator;

FIGS. 7a and 7b, respectively, show another form of sealing the rotor and stator; and FIGS. 8a and 8b, respectively, show a third exemplary form of sealing the rotor and stator.

With reference to the drawings

The housing 1 of the extraction column is provided near its upper end with an inlet 2 for a specifically denser liquid and with an outlet 3 for less dense liquid and, near its lower end, with an outlet 4 for the specifically denser liquid and an inlet 5 for less dense liquid. Mounted within the housing 1 is a rotor comprised of a centrally arranged shaft 6 which has a plurality of stirring means 7 secured thereto and is arranged to be driven by a motor 8, the individual stirring means being arranged one downstream of another, spaced apart from each other.

Figure 1:
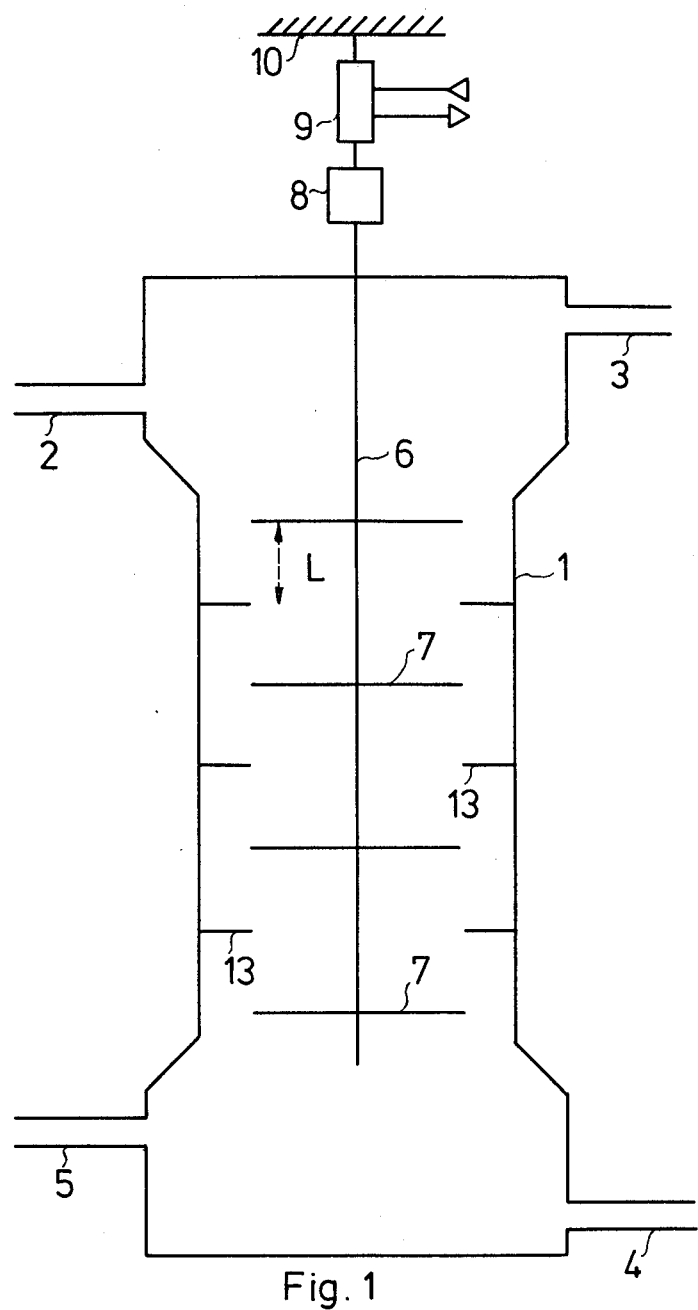
FIG. 1 is a side-elevational view of an extraction column provided with a level-variable rotor.

As shown in FIG. 1, the housing 1 has a stator secured to its inside, the stator being comprised of a plurality of stator collars (13) in horizontal position, which are arranged downstream of, spaced from, each other. The shaft 6 and motor 8 are secured to a lifting cylinder 9 which in turn is suspended from a ceiling 10. The lifting cylinder 9 permits the stirring means 7 to be lifted or lowered at a spacing L so that they closingly cooperate with the stator collars 13.

Figure 2:
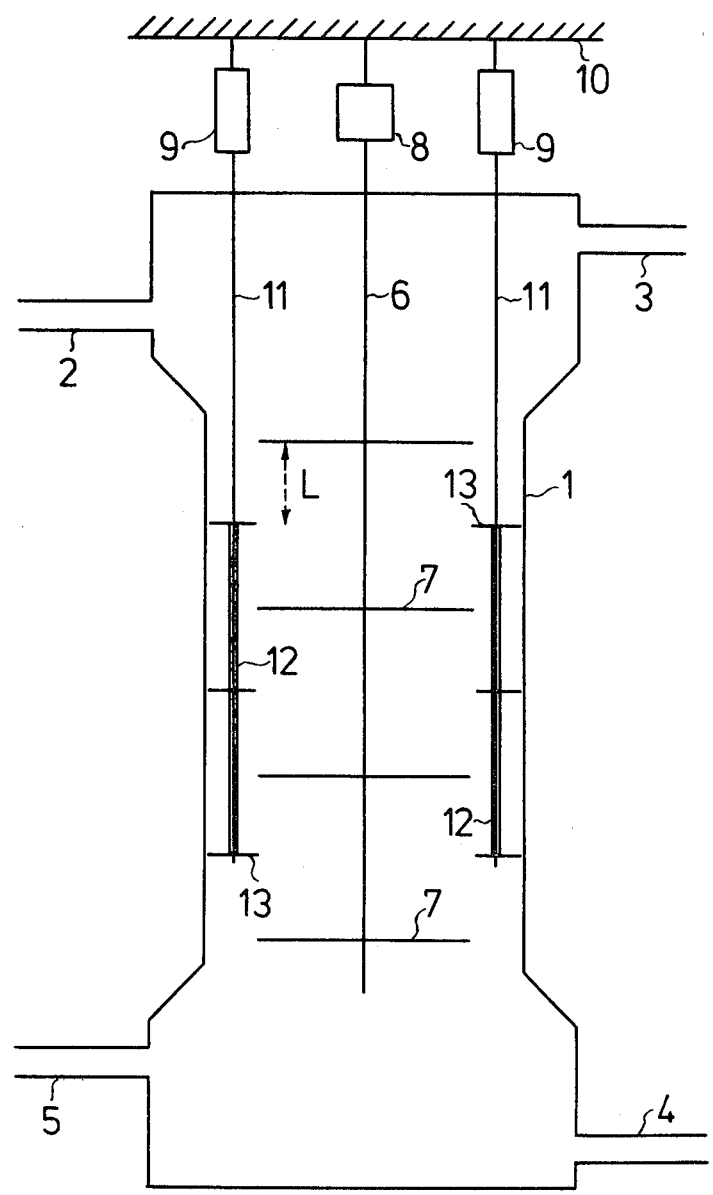
FIG. 2 is a side-elevational view of an extraction column with a level-variable stator.

As shown in FIG. 2, the horizontally arranged stator collars 13 which form the stator have vertically extended tie rods 11 passed through them, the tie rods being secured to the lifting cylinder 9 which is suspended from the ceiling 10. Spacers 12 are pulled over the tie rods 11, within the region between the stator collars 13. To avoid remixing, it is necessary for the spacing between the stator collars 13 and inside wall of the housing 1 to be minimized. Shaft 6 is rigidly connected to ceiling 10 via motor 8. The lifting cylinders 9 permit the various stator collars 13 to be lifted or lowered as a whole at a spacing L, whereby they are caused closingly to cooperate with stirring means 7.

The stirring means 7 are formed at at least one place thereof with a disk 14 having an area sufficiently large to cover the inner free area of the respective adjacent stator collars 13. Baffle plates 15 associated with the stirring means 7 are secured either to the two sides of disk 14 (as shown in FIG. 3) or to its under side (as shown in FIG. 4) or its upper side (as shown in FIG. 5).

As shown in FIGS. 6a and 6b, the annular contact area between stator and rotor is made elastic. To this end, the disks 14 are formed with outwardly directed, and the stator collars 13 are formed with inwardly directed extensions of elastic material. On lowering or lifting the rotor and stator, respectively, the two elastic extensions overlap while forming some sort of a lip sealing which permits the extraction column to be tightly closed at various levels, across its entire cross-sectional area.

As shown in FIGS. 7a and 7b, each of the stator collars 13 has an O-shaped ring 17 secured to its upper side which permits the extraction column to be tightly closed at various levels, across its entire cross-sectional area, upon the disks 14 being lowered or the stator collars 13 being lifted.

As shown in FIGS. 8a and 8b, each of the stator collars 13 has a bellows 18 secured to its upper side which is compressed upon the disks 14 being lowered or stator collars 13 being lifted whereby the extraction column becomes tightly closed at various levels across its entire cross-sectional area.

We claim:

1. A multistage column for countercurrent extraction of two liquids of different specific density, comprising:
   a housing in upright position provided at its upper end with an upper inlet and upper outlet and, at its lower end, with a lower inlet and lower outlet, the upper inlet and lower outlet permitting specifically denser liquid to be introduced into the column and to be taken therefrom, and the lower inlet and upper outlet permitting specifically less dense liquid to be introduced into the column and to be taken therefrom;
   a plurality of annular stator collars secured to the inside wall of the housing, the individual stator collars being arranged downstream of, and speced apart from, each other;
   a rotatable shaft arranged centrally within the housing so as to extend vertically downward therein, said shaft terminating freely above the housing's bottom portion;
   a plurality of stirring means spaced apart from each other, the individual stirring means being perpendicularly secured to the shaft; a plurality of disks with a diameter sufficient to cover the inner free area of the respective stator collar, at least one such disk being secured to each stirring means at at least one point thereof;
   a lifting cylinder permitting the shaft and the attached the stirring means to be lifted for starting operation and during operation, or lowered during standstill so that the disk-provided stirring means and stator collars, respectively, are vertically movable relative to each other to a predetermined spacing;
   and a plurality of encircling packing means permitting the disk and stator collars to be sealed, each sealably related disk and stator collar combination having at least one such packing means placed at least at one position therebetween, the specifically denser liquid and specifically less dense liquid undergoing phase separation during standstill within limited regions only.

2. The column as claimed in claim 1, wherein the disks are formed with outwardly directed extensions of elastic material and the stator collars are formed with inwardly directed extensions of elastic material.

3. The column as claimed in claim 1, wherein each of the stator collars is formed at its upper side and under side, respectively, with an O-shaped ring.

4. The column as claimed in claim 1, wherein each of the stator collars is formed at its upper side and under side, respectively, with a bellows.

5. A multistage column for countercurrent extraction of two liquids of different specific density therein, comprising:

- a housing in upright position provided at its upper end with an upper inlet and upper outlet and, at its lower end, with a lower inlet and lower outlet, the upper inlet and lower outlet permitting specifically denser liquid to be introduced into the column and to be taken therefrom, and the lower outlet and upper outlet permitting specifically less dense liquid to be introduced into the column and to be taken therefrom;
- a rigidly mounted shaft arranged centrally within the housing so as to extend vertically downward therein, said shaft terminating freely above the housing's bottom portion;
- a plurality of stirring means spaced apart from each other, the individual stirring means being perpendicularly secured to the shaft;
- a plurality of annular stator collars mounted within the region of the inside wall of the housing, the individual stator collars being arranged downstream of, and spaced apart from, each other;
- tie rods providing support for the stator collars being suspended from lifting cylinders permitting the stator collars to be lifted for starting operation and during operation, or lowered during standstill, said tie rods having spacers pulled over them, within the region between the stator collars;
- a plurality of disks with a diameter sufficient to cover the inner free area of the respective stator collar, at least one such disk being secured to each stirring means at at least one point thereof; the disk-provided stirring means and stator collars, respectively, being arranged so as to be vertically movable relative to each other to a predetermined spacing;
- and a plurality of encircling packing means permitting the disks and stator collars to be sealed, each sealably related disk and stator collar combination having at least one such packing means placed at least at one position therebetween; the specifically denser liquid and specifically less dense liquid undergoing phase separation during standstill within limited regions only.

6. The column as claimed in claim 5, wherein the disks are formed with outwardly directed extensions of elastic material and the stator collars are formed with inwardly directed extensions of elastic material.

7. The column as claimed in claim 5, wherein each of the stator collars is formed at its upper side and under side, respectively, with an O-shaped ring.

8. The column as claimed in claim 5, wherein each of the stator collars is formed at its upper side and under side, respectively, with a bellows.

* * * * *